United States Patent
Kim

(10) Patent No.: US 8,658,281 B2
(45) Date of Patent: Feb. 25, 2014

(54) APPARATUS AND METHOD FOR SURFACE-TREATING CARBON FIBER BY RESISTIVE HEATING

(75) Inventor: Ha-jin Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 869 days.

(21) Appl. No.: 12/367,091

(22) Filed: Feb. 6, 2009

(65) Prior Publication Data

US 2010/0074834 A1 Mar. 25, 2010

(30) Foreign Application Priority Data

Sep. 22, 2008 (KR) .................. 10-2008-0092923

(51) Int. Cl.
*B32B 9/00* (2006.01)
(52) U.S. Cl.
USPC ........................................ 428/408; 443/447.2
(58) Field of Classification Search
USPC .............. 428/408; 423/447.1, 447.2; 977/742
See application file for complete search history.

(56) References Cited

U.S. PATENT DOCUMENTS

| 5,935,335 | A | * | 8/1999 | Kashiwaya et al. | ... 118/723 MR |
| 7,338,684 | B1 | * | 3/2008 | Curliss et al. | ................. 427/180 |
| 2003/0157333 | A1 | * | 8/2003 | Ren et al. | ...................... 428/408 |
| 2004/0071870 | A1 | * | 4/2004 | Knowles et al. | .............. 427/200 |
| 2005/0140064 | A1 | * | 6/2005 | Jorn et al. | ...................... 264/449 |

FOREIGN PATENT DOCUMENTS

| JP | 05044154 A | 2/1993 |
| KR | 1020020082816 A | 10/2002 |
| KR | 1020050042194 A | 5/2005 |

* cited by examiner

*Primary Examiner* — Maria Veronica Ewald
*Assistant Examiner* — Daniel H Miller
(74) *Attorney, Agent, or Firm* — Cantor Colburn LLP

(57) ABSTRACT

In an apparatus for surface-treating a carbon fiber, wherein the carbon fiber is heated by resistive heating, a carbon-containing gas is disposed on the carbon fiber, and carbon nanotubes are grown on a surface of the carbon fiber.

14 Claims, 3 Drawing Sheets

APPARATUS AND METHOD FOR SURFACE-TREATING CARBON FIBER BY RESISTIVE HEATING

CROSS-REFERENCE TO RELATED APPLICATION

This application claims the priority to Korean Patent Application No. 10-2008-0092923, filed on Sep. 22, 2008, and all the benefits accruing therefrom under 35 U.S.C. §119(a), the contents of which in its entirety are herein incorporated by reference.

BACKGROUND

1. Field

This disclosure relates to an apparatus and method for surface-treating carbon fiber by resistive heating.

2. Description of the Related Art

A carbon fiber can have a carbon content of about 90 percent ("%"), or more. The carbon fiber can be produced from a precursor, such as polyacrylonitrile ("PAN"), rayon, pitch, or the like which is stabilized in an oxygen atmosphere, carbonized, and then graphitized at a high temperature of about 1500° C., or more. Carbon fiber materials are high-function and high-strength materials, and can have excellent specific modulus, specific strength, thermal stability, corrosion resistance, conductivity, vibration attenuation, and wear characteristics. Due to such characteristics, carbon fiber materials can be used in various applications, such as aerospace materials, reinforcing materials for engineering or construction, sports or leisure products, automobile parts or structures, pressure vessels, or external materials for electronic devices. In most applications the carbon fiber is not used alone but in a composite including a matrix. The matrix can include a polymer, a ceramic, a metal, or the like. In the composite, the carbon fiber can function as a reinforcing material. The mechanical characteristics of the composite may depend on characteristics of the matrix, characteristics of the reinforcing material, the content of the reinforcing material, and interfacial characteristics between the matrix and the reinforcing material. It is desirable to improve interfacial adhesion between the matrix and the reinforcing material. Improved interfacial adhesion between a carbon fiber reinforcing material and a matrix can contribute to improved strength and weight in a high-strength lightweight composite.

An interfacial shear strength between a matrix and a reinforcing material can be improved using chemical methods or physical methods. In a chemical method, a chemical bonding force between the matrix and the reinforcing material is increased. In a physical method, an interfacial surface area between the matrix and the reinforcing material is increased, thereby increasing a physical bonding force between the matrix and the reinforcing material. In addition, a physical bonding force between a matrix and a reinforcing material including a carbon fiber can be increased by treating the carbon fiber with microwaves or a plasma to increase a surface roughness of the carbon fiber, or by disposing a secondary phase on a surface of the carbon fiber. However, when the surface roughness of the carbon fiber is increased, using microwaves or a plasma, for example, one or more of the characteristics of the carbon fiber can be degraded, although the interfacial shear strength may be increased. On the contrary, when a whiskerization process is performed on a surface of a carbon fiber to increase a thickness and a surface area of an interface between the carbon fiber and the matrix, the characteristics of the carbon fiber may not be affected and the interfacial shear strength can be increased by between about 200% to about 300%. Accordingly, a method of increasing the thickness and the surface area of the interface by whiskerization can be effective for increasing a mechanical strength of a composite, which can be achieved by improving the interfacial shear strength. Accordingly, it is desirable to have a carbon fiber composite having improved interfacial shear strength, as is an improved method to provide whiskers on a carbon fiber surface.

SUMMARY

The above described and other drawbacks are alleviated by an apparatus and a method for surface-treating a carbon fiber by resistive heating.

Disclosed is an apparatus for surface-treating a carbon fiber, wherein the carbon fiber is heated by resistive heating, a carbon-containing gas is disposed on the carbon fiber, and carbon nanotubes ("CNTs") are grown on a surface of the carbon fiber.

The apparatus may include: a plurality of electrode rollers transferring the carbon fiber by a rotational motion; and a power supply apparatus applying a voltage between the plurality of electrode rollers, wherein the carbon fiber moving between the plurality of electrode rollers is heated by applying the voltage between the plurality of electrode rollers.

The apparatus may further include a catalyst layer disposing apparatus configured to dispose a catalyst layer, the catalyst layer including a catalyst for growing CNTs on a surface of the carbon fiber.

Also disclosed is an apparatus for surface-treating a carbon fiber, the apparatus including first and second electrode rollers transferring the carbon fiber between the first and second electrode rollers by a rotation motion and spaced apart from each other by an interval; and a first power supply apparatus applying a voltage between the first electrode roller and the second electrode roller, wherein the carbon fiber moves between the first electrode roller and the second electrode roller, the carbon fiber is heated by applying the voltage between the first electrode roller and the second electrode roller, a carbon-containing gas is disposed on the carbon fiber, and CNTs are grown on a surface of the carbon fiber to form a surface-treated carbon fiber.

The first and second electrode rollers and the first power supply apparatus may be placed in a chamber having an oxygen-free atmosphere.

In an embodiment the carbon-containing gas is disposed into the chamber and the carbon fiber is heated while moving between the first electrode roller and the second electrode roller.

In an embodiment, at least one of a length and a diameter of the CNTs may depend on at least one factor selected from the group consisting of a temperature of the carbon fiber, a rotational speed of either of the first and second electrode rollers, and the interval between the first and second electrode rollers.

The carbon fiber may be heated to a temperature between about 300° C. to about 1500° C. In an embodiment, the apparatus may further include a bobbin on which the surface-treated carbon fiber is wound.

A catalyst layer which includes a catalyst for CNT growth may be disposed on the surface of the carbon fiber, and the CNTs move in a direction towards the first electrode roller, wherein the catalyst layer comprises a catalyst for carbon nanotube growth, and the CNTs may have grown on the surface of the carbon fiber.

The catalyst layer may include at least one element selected from the group consisting of Fe, Ni, Co, Pd, Pt, Ir, and Ru. The catalyst layer may be disposed by vacuum deposition, liquid deposition, or a combination of vacuum deposition and liquid deposition.

The apparatus may further include a catalyst layer disposing apparatus configured to dispose the catalyst layer on the surface of the carbon fiber. The catalyst layer disposing apparatus may include: an electrolytic solution including a catalytic metal; third and fourth electrode rollers moving the carbon fiber by a rotational motion; and a second power supply apparatus applying a voltage between the third and fourth electrode rollers, wherein when the voltage is applied between the third and fourth electrode rollers and the catalyst layer is disposed on the surface of the carbon fiber which moves in the electrolytic solution.

The apparatus may further include at least one transfer roller transferring the carbon fiber, on which the catalyst layer is disposed by the catalyst layer disposing apparatus, in a direction towards the first electrode roller.

Also disclosed is a method of surface-treating a carbon fiber, the method including: heating the carbon fiber, wherein the heating includes resistive heating; disposing a carbon-containing gas on the carbon fiber; and growing CNTs on a surface of the carbon fiber. In an embodiment, the heating further includes applying a voltage between a plurality of electrode rollers which transfer the carbon fiber. In an embodiment, the method further includes disposing a catalyst layer including a catalyst for carbon nanotube growth on a surface of the carbon fiber which is disposed between the plurality of electrode rollers.

Also disclosed is a method of surface-treating a carbon fiber, the method including: transferring the carbon fiber from a first electrode roller to a second electrode roller, wherein the first and second electrode rollers are spaced apart from each other by an interval; applying a voltage between the first and second electrode rollers; heating the carbon fiber; disposing a carbon-containing gas on the heated carbon fiber; and growing CNTs on a surface of the carbon fiber to form a surface-treated carbon fiber.

The first and second electrode rollers and a first power supply apparatus may be placed in a chamber having an oxygen-free atmosphere, and the carbon-containing gas may be disposed into the chamber.

In an embodiment, at least one of a length and a diameter of the carbon nanotubes depend on at least one factor selected from a temperature of the carbon fiber, a rotational speed of either of the first and second electrode rollers, and the interval between the first and second electrode rollers.

The carbon fiber may be heated to a temperature between about 300° C. to about 1500° C. The method may further include packaging the surface-treated carbon fiber.

The method may further include disposing a catalyst layer including a catalyst for carbon nanotube growth on the surface of the carbon fiber.

The catalyst layer may include at least one element selected from the group consisting of Fe, Ni, Co, Pd, Pt, Ir, and Ru.

The catalyst layer may be disposed by vacuum deposition, liquid deposition, or a combination of vacuum deposition and liquid deposition.

The vacuum deposition may include at least one of electron-beam evaporation, sputtering deposition, and chemical vapor deposition, and the liquid deposition may include at least one of dip coating deposition, spray coating deposition, electroless-plating deposition, and electro plating deposition.

The disposing of the catalyst layer may include disposing the catalyst layer on the surface of the carbon fiber in an electrolytic solution, the electrolytic solution including a catalytic metal, wherein the disposing of the catalyst layer may include applying a voltage between third and fourth electrode rollers, the third and fourth electrode rollers transferring the carbon fiber.

The method may further include transferring the carbon fiber in a direction towards the first electrode roller.

Also disclosed is a surface-treated carbon fiber, including: carbon nanotubes grown on a surface of a carbon fiber, wherein the carbon nanotubes are grown by a method including disposing a catalyst for carbon nanotube growth on carbon fiber, heating the carbon fiber, wherein the heating includes resistive heating, the resistive heating including applying a voltage to a portion of the carbon fiber, disposing a carbon-containing gas on the carbon fiber, and growing carbon nanotubes on a surface of the carbon fiber.

These and other features, aspects, and advantages of the disclosed embodiments will become better understood with reference to the following description and appended claims.

BRIEF DESCRIPTION OF THE DRAWINGS

The above and other aspects, advantages, and features of the invention will become apparent and more readily appreciated from the following further description of the embodiments, taken in conjunction with the accompanying drawings in which.

DETAILED DESCRIPTION

Figure 1:
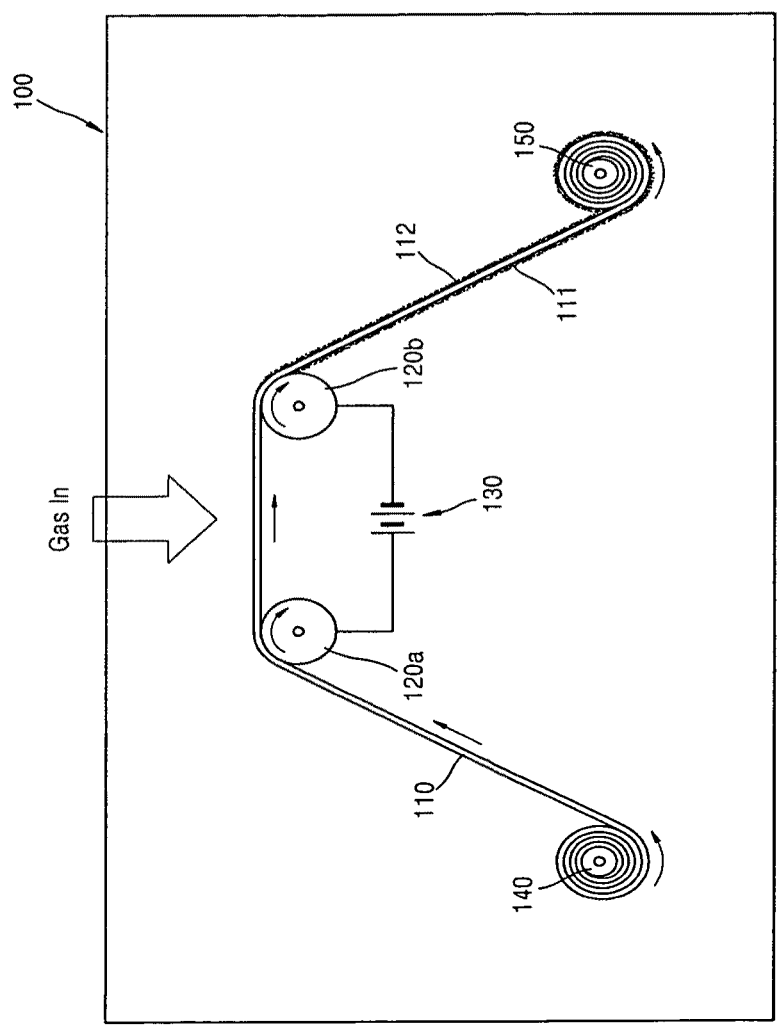
FIG. 1 is a schematic illustration of an exemplary embodiment of an apparatus for surface-treating a carbon fiber.

Aspects, advantages, and features of the invention and methods of accomplishing the same may be understood more readily by reference to the following detailed description of disclosed embodiments and the accompanying drawings. The invention may, however, may be embodied in many different forms, and should not be construed as being limited to the embodiments set forth herein. Rather, these embodiments are provided so that this disclosure will be thorough and complete and will fully convey the concept of the invention to those skilled in the art, and the invention will only be defined by the appended claims.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention is described in detail with reference to the accompanying drawings. However, the aspects, features, and advantages of the invention are not restricted to the ones set forth herein. The above and other aspects, features, and advantages of the invention will become more apparent to one of ordinary skill in the art to which the invention pertains by referencing a detailed description of the invention given below.

Carbon nanotubes ("CNTs") are lightweight and have excellent thermal conductivity, electronic conductivity, and mechanical strength characteristics. Due to such characteristics, CNTs are regarded as a desirable reinforcing material for use in a composite material. CNTs can be applied to a carbon fiber composite which includes a carbon fiber and a matrix using at least two methods. In a first method, functionalized CNTs are dispersed in the matrix so that CNTs are disposed on a surface of the carbon fiber. In a second method, CNTs are grown directly on a surface of the carbon fiber. In the first method it can be desirable to functionalize and disperse the CNTs. Thus the CNTs are dispersed in the matrix and disposed on the surface of the carbon fiber, thereby reinforcing an interface between the carbon fiber and the matrix. The first method can result in a relatively small change in an interfacial shear strength, as compared to the second method in which CNTs are grown directly on the surface of the carbon fiber, and can be used in a continuous process and in mass-production.

In the second method, in which CNTs are grown directly on a surface of the carbon fiber, a catalyst for growing CNTs is disposed on a surface of the carbon fiber and CNTs are formed using chemical vapor deposition ("CVD") at a temperature between about 600° C. to about 1100° C., specifically about 700° C. to 1000° C., more specifically between about 800° C. to about 900° C. In the second method, CNTs are disposed at an interface between the carbon fiber and the matrix and thus a contact force at the interface is increased and, due in part to the mechanical characteristics of CNTs, an interfacial shear strength is increased. However, a method using CVD can employ a high-temperature furnace which can have high power consumption. Also, since CNTs can grow only in limited conditions, a method using CVD can have high energy consumption and may not be appropriate for a continuous process. Disclosed embodiments include an apparatus and method for growing CNTs directly on a surface of a carbon fiber by resistive heating.

Reference will now be made in detail to embodiments, examples of which are illustrated in the accompanying drawings, wherein like reference numerals refer to like elements throughout. In the drawings, the thickness or size of respective elements is exaggerated for clarity.

FIG. 1 is a schematic illustration of an exemplary embodiment of an apparatus for surface-treating a carbon fiber.

Referring to FIG. 1, the apparatus for surface-treating a carbon fiber includes a pair of first and second electrode rollers 120a and 120b, respectively, which are spaced apart from each other at a selected interval and transfer a carbon fiber 110, and a power supply apparatus 130 applying a voltage between the first and second electrode rollers 120a and 120b. The carbon fiber 110 may be derived from polyacrylonitrile ("PAN"), rayon, pitch, or the like, or a combination comprising at least one of the foregoing materials, and may have a content of carbon of about 80 percent ("%") or more, specifically about 90% or more, more specifically about 95% or more. The specific resistance of the carbon fiber 110 may be between about 0.01 milliohms-centimeters ("mΩ·cm") to about 1000 mΩ·cm, specifically between about 0.1 mΩ·cm to about 100 mΩ·cm, more specifically between about 10 mΩ·cm to about 100 mΩ·cm, but is not limited thereto.

The first and second electrode rollers 120a and 120b, and the power supply apparatus 130, may be placed in a chamber 100. The chamber 100 may have an oxygen-free atmosphere to reduce or substantially prevent a reaction of carbon and oxygen inside the chamber 100. In an embodiment, a power supply apparatus 130 may be placed outside the chamber 100. The chamber 100 may further include a first bobbin 140 supplying the carbon fiber 110 in a direction towards the first electrode roller 120a. Herein, the carbon fiber 110 wound on the first bobbin 140 may be supplied in a direction towards the first electrode roller 120a by a rotational motion of the first bobbin 140.

In an embodiment, a catalyst layer (not shown), comprising a catalyst for growing CNTs, may be disposed on the carbon fiber 110 which is supplied in a direction towards the first electrode roller 120a. The thickness of the catalyst layer may be between about 0.1 nanometer ("nm") to about 10 micrometers ("μm"), specifically between about 0.2 nm to about 3 μm, more specifically between about 10 nm to about 1 μm, but is not limited thereto. The catalyst layer may be disposed by disposing a catalytic metal having a selected thickness on a surface of the carbon fiber 110 by vacuum deposition, liquid deposition, or the like, or a combination comprising at least one of the foregoing methods. Vacuum deposition may include electron-beam evaporation, sputtering deposition, CVD, or the like, but is not limited thereto. Liquid deposition may include dip coating deposition, spray coating deposition, electroless-plating deposition, electro plating deposition, or the like, but is not limited thereto. The catalytic metal may include at least one transition metal selected from the group consisting of Fe, Ni, Co, Pd, Pt, Ir, Ru, and the like. In an embodiment, the catalytic metal may further include an ancillary catalytic metal to improve catalytic characteristics of the transition metal. The ancillary catalytic metal may include at least one of Mo, Cu, Al, and the like.

The first and second electrode rollers 120a and 120b transfer the carbon fiber 110 when rotating and can heat the carbon fiber 110 which moves between the first and second electrode rollers 120a and 120b in response to a voltage applied by the power supply apparatus 130, up to a selected temperature. In this regard, the temperature of the carbon fiber 110 may depend on the voltage which is applied between the first and second electrode rollers 120a and 120b and an interval between the first and second electrode rollers 120a and 120b. The carbon fiber 110 may be heated to a temperature between about 200° C. to about 1600° C., specifically between about 300° C. to about 1500° C., more specifically between about 400° C. to about 1400° C., to grow CNTs.

In an embodiment, when the carbon fiber 110 which moves between the first and second electrode rollers 120a and 120b is heated, CNTs 112 grow on a surface of the carbon fiber 110. To grow the CNTs 112, a carbon-containing gas is supplied into the chamber 100. The carbon-containing gas may include $C_2H_2$, $CH_4$, $C_2H_6$, CO, or the like, or a combination comprising at least one of the foregoing carbon-containing gases. The carbon-containing gas can also be a gas produced by thermally decomposing alcohol, benzene, xylene, or the like, or a combination comprising at least one of the foregoing materials. The carbon-containing gas can also be selected from another carbon supply source. In an embodiment, the carbon-containing gas may further include Ar, $H_2$, $NH_3$, or the like, or a combination comprising at least one of the foregoing gases.

The chamber 100 may further include a second bobbin 150 for packaging a first surface-treated carbon fiber 111, which comprises the CNTs 112. The first surface-treated carbon fiber 111 can pass the second electrode roller 120b and can be wound on the second bobbin 150, and is thereby packaged.

A process for growing the CNTs 112 on the carbon fiber 110 in the apparatus for surface-treating a carbon fiber described above is hereinafter described in detail. First, the carbon fiber 110, on which the catalyst layer is disposed and which is wound on the first bobbin 140, moves between the first electrode roller 120a and the second electrode roller 120b. Then, the power supply apparatus 130 applies a selected voltage between the first electrode roller 120a and the second electrode roller 120b. As a result, a current flows between the first electrode roller 120a and the second electrode roller 120b, and the carbon fiber 110 is heated due to the electrical resistance of the carbon fiber 110. Accordingly, heat energy is generated on the surface of the carbon fiber 110. The temperature of the carbon fiber 110 may depend on the voltage applied between the first and second electrode rollers 120a and 120b, and the interval between the first and second electrode rollers 120a and 120b.

When the carbon-containing gas is disposed on the heated carbon fiber 110, on which the catalyst layer is disposed, the CNTs 112 grow on the surface of the carbon fiber 110 to form a first surface-modified carbon fiber 111. The length and diameter of the CNTs 112 may depend on, for example, the temperature of the carbon fiber 110, the rotational speed of either or both of the first and second electrode rollers 120a and 120b, and the interval between the first and second electrode rollers 120a and 120b. In an embodiment, when the first surface-modified carbon fiber 111, which comprises the CNTs 112, passes by the second electrode roller 120b, the growth of the CNTs 112 stops and the first surface-modified carbon fiber 111 is wound on the second bobbin 150, and is thereby packaged.

In an embodiment, the carbon fiber 110 may be locally heated by resistive heating, and thus an energy efficiency of a process for surface-treating a carbon fiber can be improved. In addition, since the carbon fiber 110 can be supplied and the first surface-treated carbon fiber packaged while the CNTs are being grown, the disclosed method and the disclosed apparatus can be used in a continuous, mass-production process. In an embodiment, the chamber 100 can include only two electrode rollers for resistive-heating carbon fiber, such as the first and second electrode rollers 120a and 120b. In an embodiment the apparatus can include greater than two electrode rollers.

Figure 2:
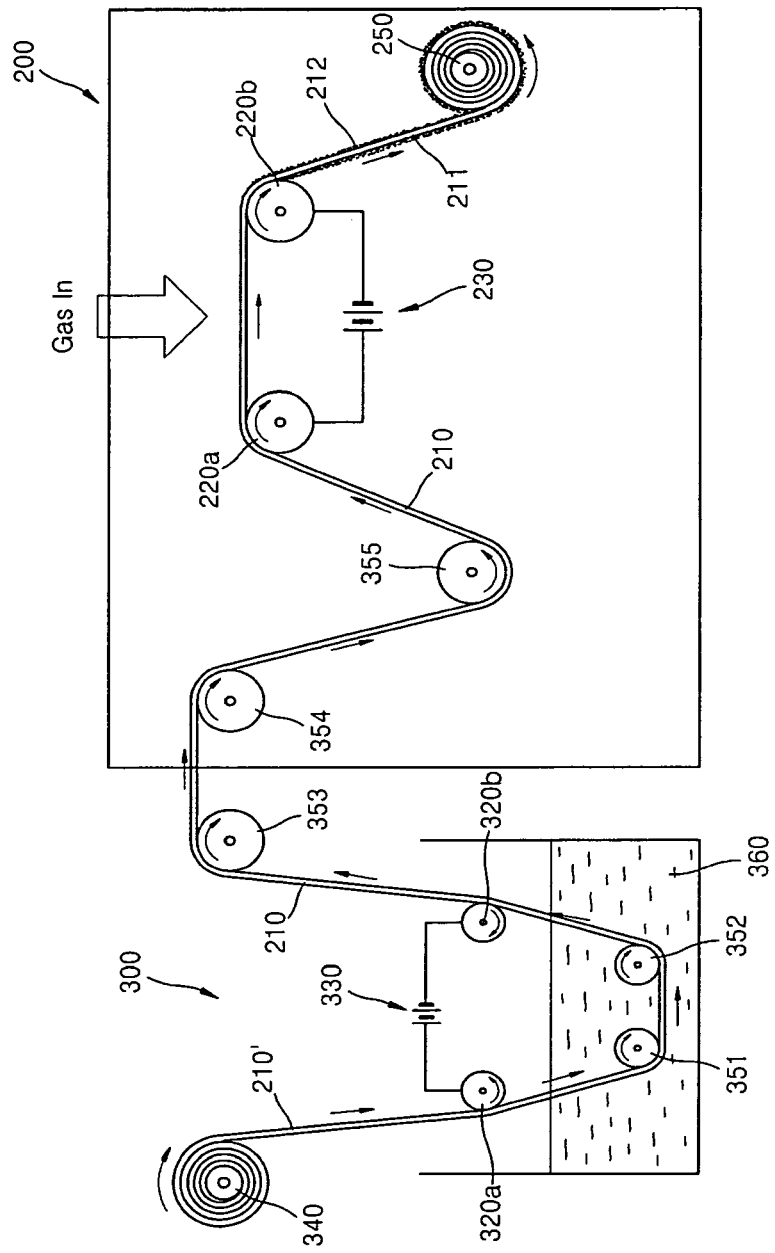
FIG. 2 is a schematic illustration of an exemplary embodiment of an apparatus for surface-treating a carbon fiber according to another embodiment.

FIG. 2 is a schematic illustration of an apparatus for surface-treating a carbon fiber according to another embodiment.

Referring to FIG. 2, the apparatus for surface-treating the carbon fiber includes a catalyst layer disposing apparatus 300 for disposing a catalyst layer on a surface of a carbon fiber 210' to form a catalyst layer coated carbon fiber 210, and an apparatus for receiving the catalyst layer coated carbon fiber 210, on which the catalyst layer is disposed by the catalyst layer disposing apparatus 300, and growing CNTs 212 on a surface of the catalyst layer coated carbon fiber 210. The apparatus for growing the CNTs 212 may include a pair of first and second electrode rollers 220a and 220b, respectively, and a first power supply apparatus 230 for applying a voltage between the first and second electrode rollers 220a and 220b. The first and second electrode rollers 220a and 220b, and the first power supply apparatus 230, may be placed in a chamber 200 having an oxygen-free atmosphere.

The first and second electrode rollers 220a and 220b transfer the catalyst layer coated carbon fiber 210 supplied by the catalyst layer disposing apparatus 300, and at the same time heat the carbon fiber 210 which moves between the first electrode roller 220a and the second electrode roller 220b up to a selected temperature using the voltage applied by the first power supply apparatus 230. The temperature of the catalyst layer coated carbon fiber 210 may depend on, for example, a voltage applied between the first and second electrode rollers 220a and 220b, or an interval between the first and second electrode rollers 220a and 220b. The catalyst layer coated carbon fiber 210 may be heated to a temperature between about 200° C. to about 1600° C., specifically between about 300° C. to about 1500° C., more specifically between about 400° C. to about 1400° C., to grow the CNTs 212. A carbon-containing gas may be supplied into the chamber 200 to grow the CNTs 212. The chamber 200 may further include a second bobbin 250 for packaging a second surface-treated carbon fiber 211, which includes the CNTs 212. The second surface-treated carbon fiber 211 passes by the second electrode roller 220b and can be wound on the second bobbin 250, and thereby is packaged.

The catalyst layer disposing apparatus 300 disposes the catalyst layer on a surface of the carbon fiber 210' by electro-plating. The catalyst layer disposing apparatus 300 includes an electrolytic solution 360 which includes a selected catalytic metal for growing CNTs, a pair of third and fourth electrode rollers 320a and 320b, respectively, for moving the carbon fiber 210' by a rotational motion, and a second power supply apparatus 330 applying a voltage between the third and fourth electrode rollers 320a and 320b. The catalytic metal included in the electrolytic solution 360 may include at least one transition metal selected from the group consisting of Fe, Ni, Co, Pd, Pt, Ir, Ru, and the like. In an embodiment, the catalytic metal may further include an ancillary catalytic metal to improve catalytic characteristics of the transition metal. The ancillary catalytic metal may include Mo, Cu, Al, or the like. The catalyst layer disposing apparatus 300 may further include a first bobbin 340, for supplying the carbon fiber 210' in a direction towards the third electrode roller 320a. In the structure described above, when the second power supply apparatus 330 applies a selected voltage between the third and fourth electrode rollers 320a and 320b, the catalyst layer (not shown) may be disposed on the surface of the carbon fiber 210' which moves in the electrolytic solution 360. The catalyst layer may be disposed to have a thickness between about 0.1 nanometer ("nm") to about 10 micrometers ("μm"), specifically between about 0.2 nm to about 3 μm, more specifically between about 10 nm to about 1 μm. The thickness of the catalyst layer is not limited thereto. In FIG. 2, reference numerals 351 and 352 denote first and second transfer rollers, respectively, which transfer the carbon fiber 210' in the electrolytic solution 360, and reference numerals 353, 354, and 355 denote third, fourth, and fifth transfer rollers, respectively, which transfer the carbon fiber 210, on which the catalyst layer is disposed by the catalyst layer disposing apparatus 300, in a direction towards the first electrode roller 220a.

A method for growing the CNTs 212 on the carbon fiber 210' in the apparatus for surface-treating a carbon fiber described above is hereinafter described in detail. First, the carbon fiber 210' which is wound on the first bobbin 340 moves into the electrolytic solution 360 by passing the third and fourth electrode rollers 320a and 320b and the first and second transfer rollers 351 and 352, the latter of which can be placed in the electrolytic solution 360. Then, when a voltage is applied between the third and fourth electrode rollers 320a and 320b, the catalytic metal is disposed on the surface of the carbon fiber 210' to form a catalyst layer.

The carbon fiber 210, on which the catalyst layer is disposed by the catalyst layer disposing apparatus 300, is guided between the first and second electrode rollers 220a and 220b which are placed in the chamber 200 by the third, fourth and fifth transfer rollers 353, 354, and 355. The first power supply apparatus 230 applies a selected voltage between the first electrode roller 220a and the second electrode roller 220b. As a result the catalyst layer coated carbon fiber 210 which moves between the first electrode roller 220a and the second electrode roller 220b is heated due to an electrical resistance of the catalyst layer coated carbon fiber 210 until it reaches a selected temperature. In this regard, the temperature of the catalyst layer coated carbon fiber 210 may depend on the voltage applied between the first and second electrode rollers 220a and 220b, and the interval between the first electrode roller 220a and the second electrode roller 220b. A carbon-containing gas is supplied into the chamber 200 when the catalyst layer coated carbon fiber 210, which comprises the catalyst layer, is heated and the CNTs 212 grow on the surface of the catalyst layer coated carbon fiber 210. The length and the diameter of the CNTs 212 may depend on a temperature of the catalyst layer coated carbon fiber 210, a rotational speed of either or both of the first and second electrode rollers 220a and 220b, and an interval between the first electrode roller 220a and the second electrode roller 220b. When the second surface-treated carbon fiber 211, on which the CNTs 212 have grown, passes by the second electrode roller 220b, the growth of the CNTs 212 stops and the second surface-treated carbon fiber 211 is wound on the second bobbin 250 and is thereby packaged.

In an embodiment, a method of disposing a catalyst layer on a surface of a carbon fiber by electroplating and a method of growing CNTs on a surface of a carbon fiber, on which the catalyst layer is disposed, can be performed at the same time. Thus the disclosed method can be used in a continuous process, and the disclosed continuous process can be desirable for mass-production. In an embodiment, the catalyst layer is disposed on a surface of a carbon fiber by liquid deposition and the liquid deposition can comprise electro-plating. The disclosed embodiment is exemplary and one of ordinary skill in the art would understand that it can be modified in various forms by one of ordinary skill in the art. In an embodiment, the catalyst layer disposing apparatus can be configured as a dip coating apparatus, a spray coating apparatus, an electroless-plating apparatus, or the like, or a combination comprising at least one of the foregoing catalyst layer disposing apparatuses.

Figure 3:
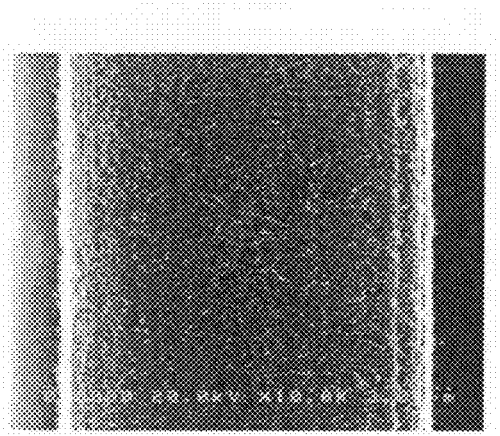
FIGS. 3 and 4 show electron microscopic images of exemplary embodiments of carbon nanotubes, which are grown on an exemplary embodiment of a surface of a carbon fiber.
Figure 4:
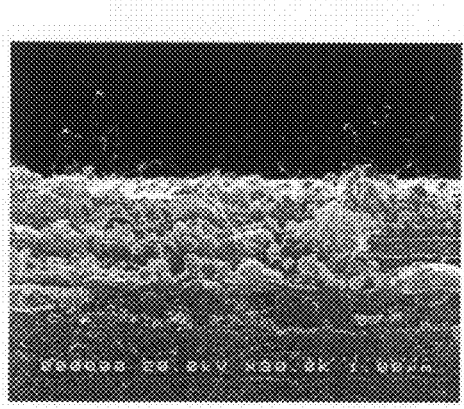

FIGS. 3 and 4 show electron microscopic images of exemplary embodiments of CNTs, which are grown on a surface of a carbon fiber to form a surface-treated carbon fiber. Specifically, to form the surface-treated carbon fiber shown in FIG. 3, a catalyst layer comprising Invar, having a thickness of 1 nm and Al, having a thickness of 2 nm, was disposed on the surface of the carbon fiber by electron-beam evaporation, and then CNTs were grown on the surface of the carbon fiber by a method comprising resistive heating. To form the surface-treated carbon fiber shown in FIG. 4, a catalyst layer was disposed on a surface of a carbon fiber by dip coating the carbon fiber in a solution comprising an iron acetate liquid catalyst, and then CNTs were grown on the surface of the carbon fiber by a method comprising resistive heating. The surface-treated carbon fibers shown in FIGS. 3 and 4, respectively, were derived from a K63712 pitch-based carbon fiber produced by Mitsubishi Chemical Co. The interval between two electrode rollers during resistive heating was 4 cm, and the voltage applied between the two electrode rollers and the current flowing between the two electrode rollers were respectively 8.8 volts ("V") and 340 milliamperes ("mA"). In addition, $C_2H_2$ gas and Ar gas were supplied into a chamber to grow the CNTs, and the time period for growing the CNTs was 10 minutes.

In an embodiment, CNTs are grown on a surface of a carbon fiber and a physical binding force between the carbon fiber and a matrix, and a surface area of an interface between the carbon fiber and the matrix, are increased. Thus an interfacial shear strength can be improved. Accordingly, stresses generated by a force disposed on a composite material can be distributed, and thus mechanical characteristics of the composite material can be improved. In addition, since the carbon fiber can be locally heated by resistive heating in a method to grow CNTs, energy consumption is reduced and heating and cooling time periods can be reduced, and thus a yield of a manufacturing process to produce the surface-treated carbon fiber can be improved. The reduced energy consumption and improved yield can desirably reduce a cost of the surface-treated carbon fiber. In addition, since in an embodiment the carbon fiber is continuously supplied, and the surface-treated carbon fiber is continuously packaged during the disclosed CNT growth process, in an embodiment mass-production can be a continuous process.

While this disclosure describes exemplary embodiments, it will be understood by those skilled in the art that various changes can be made and equivalents can be substituted for elements thereof without departing from the scope of the disclosed embodiments. In addition, many modifications can be made to adapt a particular situation or material to the teachings of this disclosure without departing from the essential scope thereof. Thus the exemplary embodiments described herein should be considered in a descriptive sense only and not for purposes of limitation. Descriptions of features or aspects within each embodiment should be considered as available for other similar features or aspects in other embodiments, where appropriate. Therefore, it is intended that this disclosure not be limited to the particular embodiment disclosed as the best mode contemplated for carrying out this disclosure.

What is claimed is:

1. A method of surface-treating a carbon fiber, the method comprising:
   resistively heating a carbon fiber to at least 300° C. by applying a voltage directly to the carbon fiber and conducting electrical current through the carbon fiber to provide a temperature effective to grow carbon nanotubes;
   disposing a carbon-containing gas on the carbon fiber while conducting electrical current through the carbon fiber to resistively heat the carbon fiber to at least 300° C.; and
   growing carbon nanotubes on a surface of the carbon fiber to surface-treat the carbon fiber.

2. The method of claim 1, wherein the resistively heating comprises applying a voltage between a plurality of electrode rollers which transfer the carbon fiber.

3. The method of claim 2, further comprising disposing a catalyst layer comprising a catalyst for carbon nanotube growth on a surface of the carbon fiber which is disposed between the plurality of electrode rollers.

4. A method of surface-treating a carbon fiber, the method comprising:
   transferring a carbon fiber from a first electrode roller to a second electrode roller, wherein the first and second electrode rollers are spaced apart from each other by an interval;
   applying a voltage directly to the carbon fiber by contacting the carbon fiber with the first and second electrode rollers;
   heating the carbon fiber to at least 300° C. to provide a temperature effective to grow carbon nanotubes;
   disposing a carbon-containing gas on the carbon fiber while conducting electrical current through the carbon fiber to resistively heat the carbon fiber to at least 300° C.; and
   growing carbon nanotubes on a surface of the carbon fiber to form a surface-treated carbon fiber.

5. The method of claim 4, wherein the first and second electrode rollers and a first power supply apparatus are placed in a chamber having an oxygen-free atmosphere, and
   the carbon-containing gas is disposed into the chamber.

6. The method of claim 4, wherein at least one of a length and a diameter of the carbon nanotubes depend on at least one factor selected from a temperature of the carbon fiber, a rotational speed of either of the first and second electrode rollers, and the interval between the first and second electrode rollers.

7. The method of claim 4, wherein the carbon fiber is heated to a temperature between about 300° C. to about 1500° C.

8. The method of claim 4, wherein the method further comprises packaging the surface-treated carbon fiber.

9. The method of claim 4, wherein the method further comprises disposing a catalyst layer comprising a catalyst for carbon nanotube growth on the surface of the carbon fiber.

10. The method of claim 9, wherein the catalyst layer comprises at least one element selected from the group consisting of Fe, Ni, Co, Pd, Pt, Ir, and Ru.

11. The method of claim 9, wherein the catalyst layer is disposed by vacuum deposition, liquid deposition, or a combination of vacuum deposition and liquid deposition.

12. The method of claim 11, wherein the vacuum deposition comprises at least one of electron-beam evaporation, sputtering deposition, and chemical vapor deposition, and the liquid deposition comprises at least one of dip coating deposition, spray coating deposition, electroless-plating deposition, and electro plating deposition.

13. The method of claim 9, wherein the disposing of the catalyst layer comprises disposing the catalyst layer on the surface of the carbon fiber in an electrolytic solution, the electrolytic solution comprising a catalytic metal, wherein the disposing of the catalyst layer includes applying a voltage between third and fourth electrode rollers, the third and fourth electrode rollers transferring the carbon fiber.

14. The method of claim 13, wherein the method further comprises transferring the carbon fiber in a direction towards the first electrode roller.

* * * * *